United States Patent [19]

Maillot

[11] Patent Number: 4,902,233
[45] Date of Patent: Feb. 20, 1990

[54] CONNECTOR ASSEMBLY FOR ELECTRONIC MEMORY CARDS, AND READ/WRITE APPARATUS MAKING USE THEREOF

[75] Inventor: Jean C. Maillot, Ecouen, France

[73] Assignee: Schlumberger Industries, Montrouge, France

[21] Appl. No.: 123,555

[22] Filed: Nov. 20, 1987

[30] Foreign Application Priority Data

Nov. 21, 1986 [FR] France ................................ 8616202

[51] Int. Cl.⁴ .............................................. H01R 9/09
[52] U.S. Cl. ...................................... 439/62; 439/68; 439/70; 439/83
[58] Field of Search ...................... 439/62, 64, 65, 68, 439/70, 76, 81, 83, 547, 548, 554

[56] References Cited

U.S. PATENT DOCUMENTS

| | | | |
|---|---|---|---|
| 3,877,064 | 4/1975 | Scheingold et al. | 439/68 |
| 4,556,264 | 12/1985 | Tanaka | 439/62 |
| 4,614,387 | 9/1986 | Hartl | 439/83 |
| 4,746,299 | 5/1988 | Matsuoka et al. | 439/70 |

FOREIGN PATENT DOCUMENTS

8529580 2/1986 Fed. Rep. of Germany.

*Primary Examiner*—P. Austin Bradley
*Attorney, Agent, or Firm*—Sanford J. Asman

[57] ABSTRACT

A connection assembly comprises a connector and an electronic circuit fixable on the connector. The connector comprises a support having resilient conductive blades fixed thereto. The blades constitute two "under connectors" adapted respectively to cards in accordance with the ISO standard and in accordance with the AFNOR standard. The blades have support-forming material molded thereover during manufacture of the support.

7 Claims, 4 Drawing Sheets

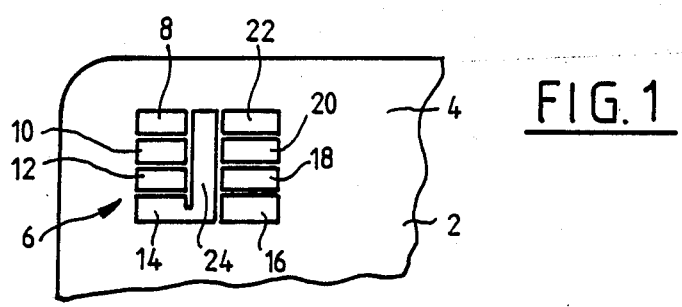
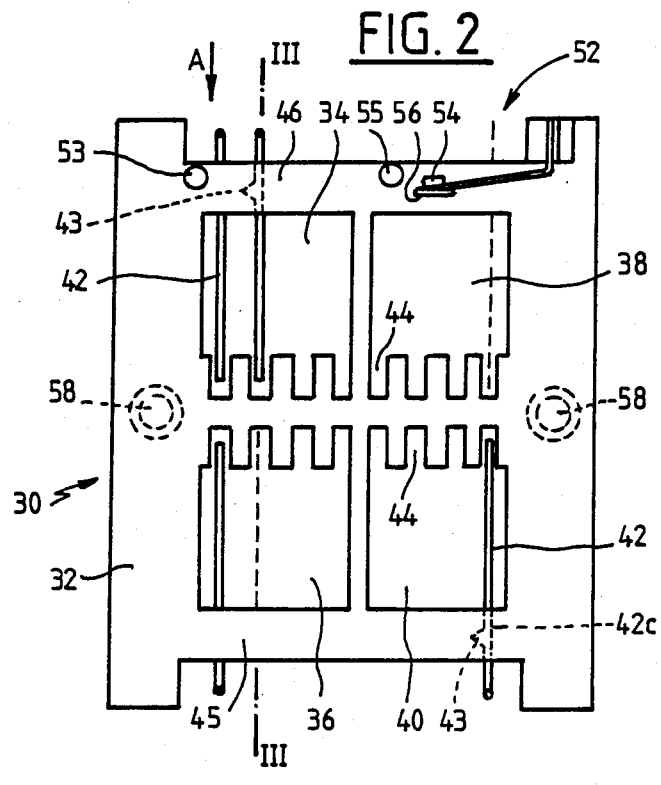

CONNECTOR ASSEMBLY FOR ELECTRONIC MEMORY CARDS, AND READ/WRITE APPARATUS MAKING USE THEREOF

The present invention relates to a connector assembly for electronic memory cards, and to electronic memory card read/write apparatus including said connector assembly.

BACKGROUND OF THE INVENTION

Electronic memory cards are now well known. Such a card is essentially constituted by a card body which is generally rectangular in shape and which has an electronic module implanted therein. The electronic module includes an integrated circuit having at least one memory circuit together with external electrical contact tabs whichh are connected to the terminals of the integrated circuit. In order to make use of such a card it is inserted into a processing machine. The processing machine includes processing circuits for making use of the information contained in the memory of the card and for modifying said information, together with read/write apparatus which serves to provide a temporary electrical connection between the contact tabs of the card and the processing circuits of the machine. This connection serves to supply power to the integrated circuit in the card, to transmit read/write instructions to the memory in the card, to apply a write voltage and a clock signal thereto, etc.

Naturally, the read/write apparatus must satisfy various conditions in order to provide proper connection between the card and the processing circuit. It must ensure that the card is properly positioned relative to the electrical connections of the reader so that the electrical connections between the integrated circuit in the card and the processing circuits of the read/write apparatus are properly set up before signals are transferred. It is also necessary for the pressure between the external contact tabs of the card and the rear connector to be sufficient to ensure good electrical contact.

Further, there are very many machines making use of read/write apparatus. Such machines include pay phones, parking meters for collecting payment of parking fees, point of sale terminals for enabling users to make purchases without using checks or cash, systems for controlling access to protected locations or to computer networks, etc. It is therefore advantageous to have read/write apparatus which is easily adaptable to these various types of machine.

Finally, there are two standards for defining the positions of the electrical contact tabs of the card in one of the main faces of the card body. It is therefore advantageous to have read/write apparatus capable of accepting either type of card and capable of recognizing each type, or which is capable of being readily modified to suit one or other of these two types of card.

An object of the invention is to provide read/write apparatus for electronic memory cards which is cheap and which is easily adapted to different types of card and to different types of machine in which the apparatus may be mounted.

SUMMARY OF THE INVENTION

This object is achieved according to the invention by providing a connector assembly for electronic memory cards of the type including a plurality of electrical contact tabs on one of its main faces, the assembly comprising:

a connector comprising a support having first and second faces, and a plurality of electrical conductors in the form of resiliently deformable blades, said conductors being fixed to said support and each blade having a curved end for coming into contact with a tab of said card and projecting beyond said first face, and a second end which projects beyond said second face;

an electronic circuit comprising an insulating support having a first face for coming into contact with said second face of the connector and having a second face provided with electrical connections and with electronic components, and having orifices for receiving said second ends of the bladeshaped electrical conductors when said connector is fixed to said electronic circuit; and means for positioning and for fixing said connector to said insulating support, and means for establishing electrical connections between said electrical connections of the electronic circuit and said second ends of said conducting blades.

BRIEF DESCRIPTION OF THE DRAWINGS

An embodiment of the invention is described by way of example with reference to the accompanying drawings, in which:

FIG. 1 is a fragmentary view of an electronic memory card showing its electrical contact tabs;

FIG. 2 is a plan view of the connector of the read/write apparatus seen from below;

FIG. 3 is a vertical section on a line III—III of FIG. 2;

FIG. 4 is a view of the connector as seen along arrow A in FIG. 2;

DETAILED DESCRIPTION OF PREFERRED EMBODIMENT

Figure 5A:
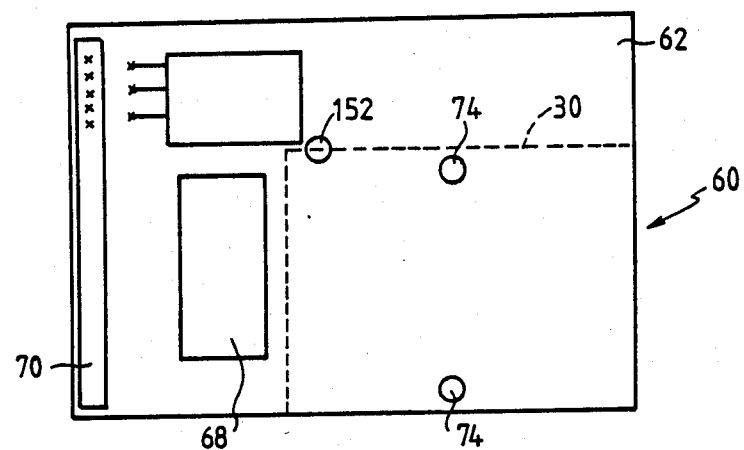
FIG. 5a is a simplified view of a printed circuit suitable for use with the connector of FIGS. 2 to 4.

FIG. 1 shows a portion of a card 2 which comprises a card body 4 and a set 6 of electrical contact tabs. For the card shown, the set of tabs 6 comprises eight contact tabs 8 to 22 whose dimensions and relative positions are defined by international and French standards (ISO, AFNOR). It should be observed that contact 14 which corresponds to ground is extended by central metallization 24.

Reference is now made to FIGS. 2 to 4 while describing a preferred embodiment of a connector 30. The connector 30 comprises a generally rectangular support 32 which essentially comprises two series of pairs of hollows referenced 34 and 36 and 38 and 40. In each of the hollows 34 to 40 there project the curved ends 42a of electrical connections 42 in the form of resilient blades. Each hollow includes four blades 42. Each pair of aligned hollows thus includes eight electric contact blades 42 whose curved ends 42a exactly reconstitute the configuration of the electrical contact tabs 8 to 22 of the card. The connector 30 thus provides electrical connections suitable for operating with two types of card, by using the blades 42 of one or other of the first and second pairs of hollows. As can be seen more clearly in FIGS. 2 and 3, the end portions 42b of the blades 42 situated beyond the curved portions 42a engage freely in corresponding notches 44 which open out into the hollows. Each of the hollows 34 to 40 has four such notches 44. Thus, the blades 42 disposed in the hollows 34 and 36 form a first connector corresponding to the locations of the contact tabs of a card as defined by the French (AFNOR) standard, whereas the blades 42 disposed in the hollows 38 and 40 constitute a second connector corresponding to the locations of the contact tabs of a card as defined by the international (ISO) standard. All of the blades 42 extend along the same general direction. The blades 42 in adjacent hollows are mutually parallel whereas the blades in the two hollows belonging to the same pair are aligned in pairs and disposed head-to-head.

As can be seen more clearly in FIG. 3, each blade 42 further includes a mid-portion 42c which passes through a portion of the support 32 which constitutes a bar 45 or 46 depending on which hollow is concerned. The opposite end 42d of each blade 42 is folded through a right-angle relative to the mid-portion 42c.

The support 32 has a bottom face 48 visible in FIG. 2 and a top face 50. The curved portions 42a of the blades 42 project below the bottom face 48 while the opposite ends 42d of said blades project above the top face 50 of the support 32.

Beneath the bottom face 48 of the support 32 there is also an electrical microswitch 52 comprising a moving member 54 and an output conductor 56 projecting above the top face 50 of the support.

The support 32 of the connector 30 is preferably obtained by molding a plastic material which is preferably suitably impregnated to withstand a temperature of about 230° C. During molding, the metal parts constituting the resilient blades 42 an the electrical output conductor 56 of the microswitch are put into place in the mold and are held in place by the plastic being molded thereover. The portion of each blade within the plastic molding includes a deformation 43 in order to prevent the blade from moving relative to the support 32. These parts are thus positioned and fixed on the support 32 in a manner which is particularly cheap. The support 32 also includes two pegs 58 for positioning theconnector relative to the body of the read/write apparatus.

It will already be understood that the connector 30 in accordance with the invention must be associated with at least two other parts in order to constitute a complete read/write apparatus, namely an electronic circuit and preferably a printed circuit which is located on the top face 50 of the support 32 of the connector 30, said two parts thus constituting a connector assembly, and secondly at least one guide part for defining a guide and positioning passage for a card beneath the bottom face 48 of the support 32.

Figure 5B:
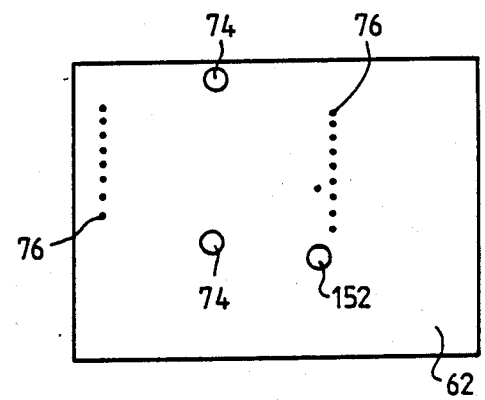
FIG. 5b is a plan view of an insulating support for the FIG. 5a electronic circuit as seen from above.
Figure 6:
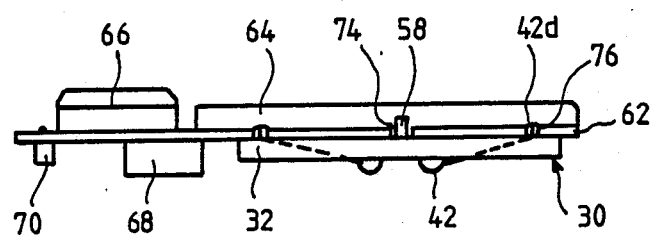
FIG. 6 shows a connector assembly constituted by the connector and the printed circuit.
Figure 8:
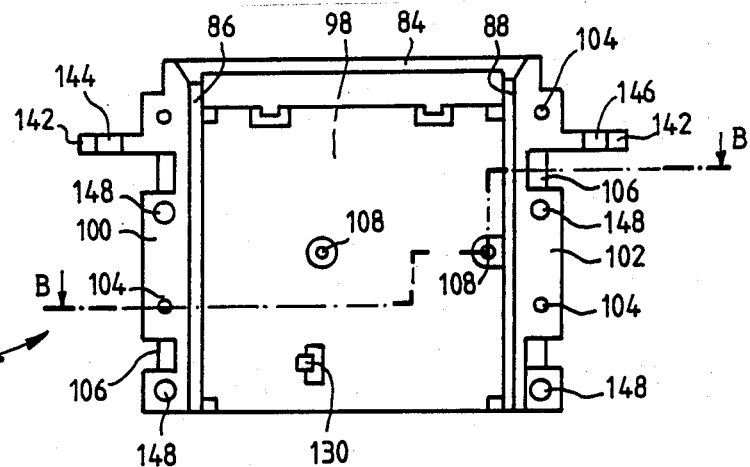
FIG. 8 is a plan view of the part shown in FIG. 7 as seen from below.
Figure 7:
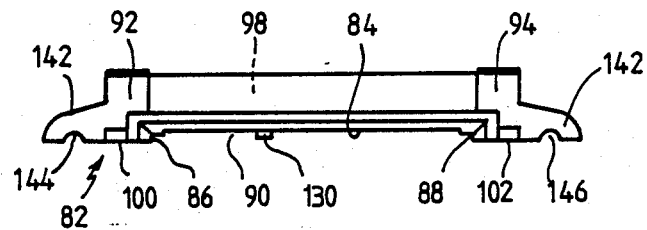
FIG. 7 is a front view of the top portion of the body of read/write apparatus for receiving a connector assembly as shown in FIGS. 2 to 5.

FIGS. 5a, 5b and 6 show an example of an electronic circuit 60 suitable for fitting to the connector 30 and an example of an electronic circuit 60 mounted on the connector. The circuit 60 includes an insulating support 62. The top face of the support 62 has electronic components such as 64 and 66 mounted thereon, while the bottom face has a component 68, a terminal strip 70, and the connector 30. The connector 30 is guided relative to the insulating support 62 by its pegs which pass loosely through holes 74 made through the insulating support 62.

It will also be understood that once the connector 30 has been positioned on the insulating support 62, the ends 42d of the conductor blades 42 pass through holes 76 provided through the insulating support and project beyond the insulating support. It is thus very easy to make electrical connections between these ends of the resilient blades and the conductor tracks of the electronic circuit by flow soldering. This operation also serves to provide mechanical connection between the connector 30 and the electronic circuit 60. Naturally, the connection could be enhanced by means of screws or any other appropriate means.

An embodiment of read/write apparatus in accordance with the invention including the connector assembly described above with reference to FIGS. 3 to 6 is now described with reference to FIGS. 7 to 11. The read/write apparatus comprises a body in the form of a bottom plate 80 shown in FIGS. 10 and 11 and a top cover 82 shown in FIGS. 7 to 9.

The top cover 82 essentially comprises means for fixing to the connector assembly 30 and 60, means for defining the side vertical walls of the card guide passage, and means for defining the side and top portions of the insertion slot. The bottom plate 80 which is intended to be fixed to the top cover 82 defines the floor of the card guide passage and the bottom portion of the insertion slot.

Figure 9:
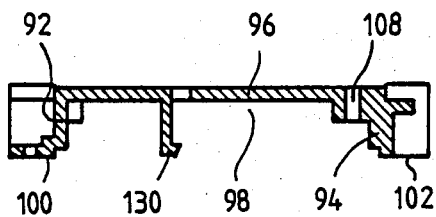
FIG. 9 is a section of the part shown in FIG. 8 on line B—B.

The top cover 82 includes a front portion which defines the top edge 84 and the side walls 86 and 88 of the insertion slot 90. The cover includes two sides 92 and 91 and a top wall 96 which defines a cavity 98 in the part 82, with the height of the cavity being considerably greater than the height of the insertion slot 90. The sides 92 and 94 define two plane surfaces 100 and 102 for fixing to the bottom plate 80. In the fixing faces 100 and 102 there are holes 104 and notches 106 for co-operating with deformable snap-action hooks. The top wall 96 of the cover 82 has two positioning and fixing holes 108 for engaging the connector assembly. FIG. 9 also shows a deformable hook 130 which projects into the cavity of the cover 82.

Figure 10:
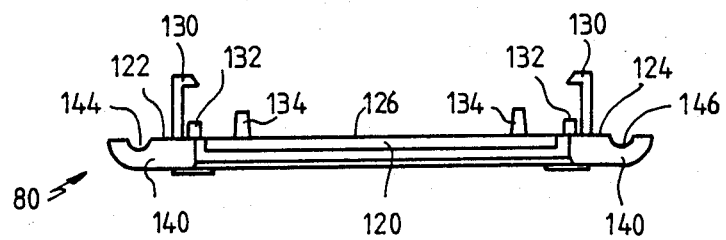
FIG. 10 is a front view of the bottom portion of the body of the read/write apparatus.
Figure 11:
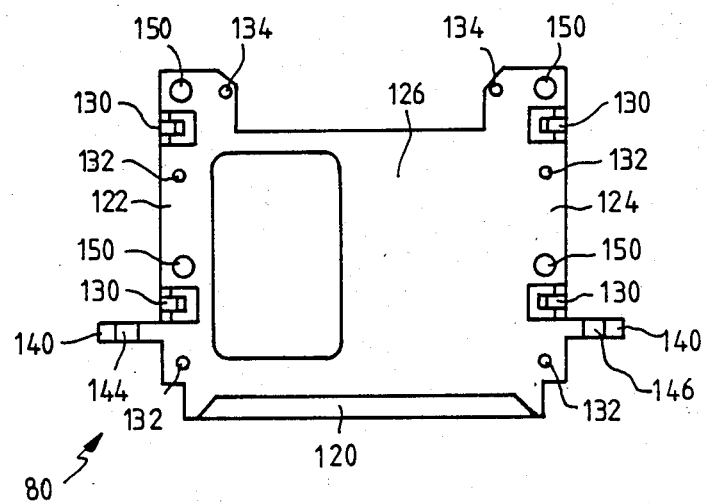
FIG. 11 is a plan view of the part shown in FIG. 10, as seen from above.

The bottom plate 80 of the read/write apparatus is now described with reference to FIGS. 10 and 11. The part 80 includes a front portion 120 which defines the bottom wall of the insertion slot 90, two side portions 122 and 124 which are intended for co-operating with the assembly faces 100 and 102 of the part 82, and a plane central portion 126 which constitutes the floor of the guide passage. In order to assemble and position the parts 80 and 82 relative to each other, the bottom plate 80 has four deformable snap-fastening hooks 130 for co-operating with snap-fastening notches 106 on the cover 82, together with pegs 132 for penetrating into the holes 104 of the cover 82. In addition, the bottom plate 80 has two tenons 134.

Further, in accordance with the invention, the read/write apparatus includes a plurality of means for fixing to the machine in which the apparatus is mounted. As can be seen in FIGS. 7 to 11, the cover 82 and the bottom plate 80 are provided with lugs 140 and 142 which, after the parts 80 and 82 have been assembled together, define two fixing holes 144 and 146 whose axes are parallel to the insertion passage. Further, the side portions of the cover 82 and of the bottom table 80 are provided with fixing holes 148 and 150 which have axes perpendicular to the insertion passage. The read/write apparatus is thus capable of being fixed to the machine in two different manners.

The read/write apparatus is assembled and mounted as follows: the connector assembly is put into place in the cavity of the cover 82; the hook 130 penetrates through a hole 152 in the insulating support 62 of the electronic circuit 60; and the pegs penetrate into the fixing holes 108 of the cover 82.

The read/write apparatus is used in a manner which is obvious from the above description. The card is inserted in the insertion slot with its electrical contact tabs foremost. The card is pushed into the sertion slot until the leading edge of the card comes into contact with the microswitch 52. During this stage, the card is guided by the floor and the side walls of the insertion passage. In this position, the curved portions of the contact blades 42 are face to face with the contact tabs of the card. The resilient deformation of the blades ensures that good electrical connection is provided between the card and the processing machine. Further, the ends 42c of the conducting resilient blades 42 are guided laterally because they remain inside the notches 42 provided in the hollows.

It follows from the above description that the invention solves the problem addressed.

The connector 30 is very simple in structure and may be used for processing cards having contact tabs corresponding to one or other of the two standards.

The electronic circuit 60 may be adapted to the desired mode of processing, and in particlar to working with cards of both standards or with cards of one standard only. All that is required is that the insulating mechanical support 60 should be standard and should have the same fixing holes and the same orifices for receiving the ends 42d of the conducting blades of the connector.

Similarly, the connector 30 associated with the electronic circuit 60 is capable of being mounted to the body of different read/write apparatuses. However, it may be observed that the body described with reference to FIGS. 7 to 11 presents numerous advantages. It is very compact. The electronic circuit is received inside the body and is therefore protected. It is very easy to assemble and can be mounted in several different ways in the card-using machine.

The preferred embodiments disclosed and discussed herein are intended to be illustrative in nature and not as limiting the scope of the present invention, which is defined by the claims appended hereinbelow.

I claim:

1. A connector assembly for a read/write apparatus in which an electronic memory card can be inserted, said memory card including a plurality of electrical contact tabs on one of its main faces, the assembly comprising:

a connector, comprising a support having first and second faces and a plurality of electrical conductors in the form of resiliently deformable blades, said conductors being fixed to said support and each blade having a curved end with a portion for making a contact with a tab of said card and projecting beyond said first face and a second end which projects beyond said second face;

an electronic circuit comprising an insulating support having a first face for making a contact with said second face of the connector and having a second face provided with electrical connections and with electronic components, and having means for receiving said second ends of the blade-shaped electrical conductors when said connector is fixed to said electronic circuit;

means for positioning and for fixing said connector to said insulating support; and means for establishing electrical connections between said electical connections of the electronic circuit and said second ends of said conducting blades.

2. A connector assembly according to claim 1, wherein:

said connector support further comprises means for positioning and fixing said connector support to a part of said read/write apparatus defining a guiding passage for the insertion of the card.

3. A connector assembly according to claim 1, wherein:

said connector comprises at least two sets of conducting blades, with the blades in two adjacent sets being mutually parallel and with pairs of corresponding blades in the two different sets being in alignment, and wherein said connector support includes two hollows aligned in the general direction of said blades, with said curved end of each blade engaging in one of said hollows.

4. A connector assembly according to claim 2, wherein:

said connector support is made by molding, with a mid-portion of each blade having support-forming material molded thereover.

5. A connector assembly according to claim 3, wherein:

said connector support further comprises notches communicating with said hollows, such that the first end of each blade is disposed beyond said curved portion and engages freely in one of said notches.

6. A connector assembly according to claim 3, wherein:

said connector support further comprises means for positioning and fixing said connector support to a part of said read/write apparatus defining a guiding passage for the insertion of the card.

7. A read/write apparatus into which electronic memory cards can be temporarily inserted, comprising:

a connector assembly, including a connector comprising a support having first and second faces and a plurality of electrical conductors in the form of resiliently deformable blades, said conductors being fixed to said support and each blade having a curved end with a portion for making a contact with a tab of said card and projecting beyond said first face, and a second end which projects beyond said second face and an electronic circuit comprising an insulating support having a first face for making a contact with said second face of the connector and having a second face provided with electrical connections and with electronic components, orifices for receiving said second ends of the blade-shaped electrical conductors when said connector is fixed to said electronic circuit, means for positioning and for fixing said connector to said insulating support and means for establishing electrical connections between said electrical connections of the electronic circuit and said second ends of said conducting blades;

a first part including a portion for receiving said connector assembly, a front portion for defining the top edge of an insertion slot for said cards, and two side portions for defining the two side edges of said insertion slot and two side walls of a card insertion passage, each of said side portions additionally including a fixing face;

a second part including a front portion for defining the bottom edge of said insertion slots, two side portions for cooperating with the fixing faces of said first part, and a plane central portion for constituting the floor of said insertion passage; and means for fixing said first and second parts to each other via their fixing faces, said support of the connector further comprising means for positioning and fixing said support to said first part.

* * * * *